(12) United States Patent
Eason

(10) Patent No.: US 9,049,846 B2
(45) Date of Patent: Jun. 9, 2015

(54) FOLDABLE POULTRY BROOD BOX

(75) Inventor: Robert W. Eason, Boise, ID (US)

(73) Assignee: Outpak, Inc.

( * ) Notice: Subject to any disclaimer, the term of this patent is extended or adjusted under 35 U.S.C. 154(b) by 0 days.

(21) Appl. No.: 13/607,776

(22) Filed: Sep. 9, 2012

(65) Prior Publication Data

US 2013/0061811 A1    Mar. 14, 2013

Related U.S. Application Data

(60) Provisional application No. 61/532,144, filed on Sep. 8, 2011.

(51) Int. Cl.
*A01K 31/19* (2006.01)

(52) U.S. Cl.
CPC ...................................... *A01K 31/19* (2013.01)

(58) Field of Classification Search
CPC ........................................................ B65D 5/32
USPC ......... 119/301, 302, 303, 304, 305, 306, 307,
119/308, 309, 310, 428, 430, 431, 437;
229/122.21, 113, 23 A, 100, 107, 115,
229/116, 117.28, 120.1, 120.011, 122.23;
237/3, 4, 14, 15
See application file for complete search history.

(56) References Cited

U.S. PATENT DOCUMENTS

| | | | | | |
|---|---|---|---|---|---|
| 2,646,915 | A | * | 7/1953 | Bockmann | 229/113 |
| 3,476,305 | A | * | 11/1969 | Asman | 229/113 |
| 3,478,722 | A | * | 11/1969 | Falcone, Jr. et al. | 119/431 |
| 5,150,646 | A | * | 9/1992 | Lonczak | 100/34 |
| 5,192,019 | A | * | 3/1993 | Meehan | 229/101 |
| 5,690,274 | A | * | 11/1997 | Yang | 229/117 |
| 6,109,513 | A | * | 8/2000 | Dugan | 229/122.28 |
| 6,305,599 | B2 | * | 10/2001 | Tsubaki et al. | 229/122.23 |
| 8,360,261 | B2 | * | 1/2013 | Eason et al. | 220/495.06 |
| 2011/0139791 | A1 | * | 6/2011 | Eason et al. | 220/495.06 |

* cited by examiner

*Primary Examiner* — Rob Swiatek
*Assistant Examiner* — Ebony Evans
(74) *Attorney, Agent, or Firm* — Charles R. Clark

(57) ABSTRACT

A foldable poultry brood box having a folding bottom, folding endwalls, and folding sidewalls provides a sheltered environment for the maturation of a brood of young poultry. Preferably, after the brood box is deployed, a floor overlay insert is placed and retained within the brood box to overlay, bridge over, and cover substantial portions of two floor free edges.

16 Claims, 16 Drawing Sheets

FOLDABLE POULTRY BROOD BOX

CROSS-REFERENCE TO RELATED APPLICATIONS

This application claims the benefit of U.S. Provisional Application No. 61/532,144, filed Sep. 8, 2011.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Various poultry brood boxes and systems have been developed as tools in the ongoing efforts by society to raise poultry from chicks to more mature poultry. An object of the present invention is to provide a foldable poultry brood box that is inexpensive, portable, easily deployable (erectable), and collapsible and more convenient and easier to use than prior art brood boxes. After use at a location in the raising of a brood of chicks, the present foldable poultry brood box can be collapsed into a more compact form for storage or disposal.

BRIEF SUMMARY OF THE INVENTION

The present invention is an easily deployable (erectable) foldable poultry brood box with a novel open-topped truncated generally square-based four-sided pyramid shape for use with a suitable poultry bedding for receiving, holding, and raising of poultry chicks. Preferably, the brood box includes a floor overlay insert overlaying two interior floor free edges. The brood box is constructed substantially from rigid stock sheet material including corrugated cardboard, paperboard, fiberboard, corplast plastic sheet material, or coated sheet materials.

The present invention is a novel foldable poultry brood box having a folding bottom, two folding endwalls, and two folding sidewalls that a user may reversibly and selectively shift from a folded storage condition to an unfolded deployed condition forming an open-topped container having an upper inner perimeter opening that preferably receives and retains through said perimeter opening within the interior of said box a floor overlay insert and a suitable poultry bedding. When in the unfolded deployed condition, the brood box may be used to receive and retain one or more poultry chicks for sheltering, caring, and raising to a more mature condition.

The brood box when in a deployed condition helps provide said chicks with a warm, nurturing environment with feed and water supplied by a poultry feeder and a poultry watering device placed within said brood box and preferably with warmth provided by a lamp fixture selectively attached along an upper inner perimeter opening of said brood box.

In a basic embodiment, as shown in FIGS. 1 to 7 and 9 to 11, a foldable poultry brood box having an open top comprises two preferably die-cut pre-scored duplicate congruent half brood box blanks [4 and 6] foldably connected together one blank to the other blank; each said blank having a foldable rectangular three-panel floor [14]; said three-panel floor comprising a larger isosceles right triangular panel [18] flanked by and foldably connected along each leg to one of two respective smaller isosceles right triangular panels [20 and 22]; an isosceles trapezoidal endwall [30] having an endwall smaller base free edge, two endwall angled leg edges, and an endwall larger base edge, said endwall foldably connected along said endwall larger base edge to said floor along a floor-length hypotenuse edge of said larger isosceles right triangular panel; said floor foldably connected at each floor end to one of two respective right trapezoidal sidewalls [36 and 38] along a respective sidewall larger base edge of said sidewall; each said sidewall having a sidewall angled leg edge adjacent and foldably connected to a respective endwall angled leg edge of said endwall and a sidewall perpendicular leg edge away from said endwall, and a sidewall smaller base free edge; and said floor having a floor-length floor free edge 16 foldably connecting between said sidewall perpendicular leg edges; and said two blanks aligned to one another with respective said floor-length floor free edges adjacent and along one another and with respective sidewall perpendicular leg edges of one said blank foldably connected to adjacent sidewall perpendicular leg edges of the other said blank; and said endwall smaller base free edges of said endwalls and said sidewall smaller base free edges of said sidewalls defining an upper inner perimeter opening in said brood box.

Regarding said basic embodiment, said foldable poultry brood box is a generally square-based truncated four-sided pyramid shaped open-topped container having four interior corners, said open-topped container having an upper inner perimeter opening 88 defined by the smaller base free edges of said brood box and said sidewalls and said endwalls inwardly and upwardly slope from adjacent said floors to said upper inner perimeter opening. The inwardly and upwardly sloping walls of said brood box surround, shelter, and contain a pocket of fresh air, light, and warmth conducive to the healthy maturation of poultry chicks.

In each preferred embodiment 2, 302, 412, and 502, after said box is unfolded, a floor overlay insert 8 having a transverse fold line 10 is placed and retained within said brood box to overlay, bridge over, and cover substantial portions of said two floor free edges 16 of said two floors and adjacent portions of said floors of said blanks; thereafter preferably a suitable poultry bedding is placed within the assembled said poultry brood box to cover said floor overlay insert and provide a layer of bedding for poultry chicks placed within the brood box.

Preferably, the box blanks are fabricated from a corrugated cardboard and the floor overlay insert 8 is fabricated from a VC3 corrugated cardboard or other suitable corrugated cardboard that is water-resistant. The box blanks may also be fabricated from a corrugated plastic material such as Corplast material or another suitable sheet material.

Preferably, at least one hooded electric light fixture 90 equipped with an incandescent bulb or an infra-red (IR) bulb and having a spring clamp mount is attached by means of the clamp mount along one top edge of the brood box (along the upper inner perimeter opening 88) with the fixture aimed into the interior of the brood box from above whereby light and heat are directed into the box. Preferably, a light fixture reinforcement overlay panel 92 is attached preferably with staples or other joining means known in the art to overlay a portion of said top edge to provide additional support for the light fixture.

Steps in deployment for use of a folded poultry box entail: (1) unfolding the folded brood box; (2) preferably inserting and placing a floor overlay insert within the erect structure; (3) inserting and placing a suitable layer of suitable poultry bedding into the box; (4) inserting and placing a suitable poultry watering device and a poultry feeder into the box preferably atop the layer of bedding; and preferably (5) attaching along a top edge of the brood box at least one hooded electric light fixture having a spring clamp mount and having an incandescent bulb or an infra-red (IR) bulb by means of the clamp mount with the fixture aimed into the interior of said brood box.

After deployment of the brood box, a selected brood of chicks may be placed within the box for maturation and the light fixture can be plugged in and energized to shine into the box. The light fixture, watering device, and the poultry feeder can be chosen from fixtures, devices and feeders commonly used in poultry husbandry.

Poultry bedding for use in the brood box can be wood shavings, chopped up cardboard, wood fiber pellets, chopped low-dust straw, or other suitable bedding material known in the art of poultry husbandry.

A principal objective of this invention is to help a person who wants to raise a brood of poultry by providing a foldable poultry brood box invention having a foldable floor and preferably having an insertable floor overlay insert that can be easily shifted from a folded storage condition to and from an unfolded deployed condition; and that can be selectively and conveniently collapsed after use.

The invention is a novel foldable poultry brood box having a folding bottom and a floor overlay insert that is easy to move from one location to another and can be easily collapsed after use and that helps provide a safe controlled enclosure (environment) to help protect chicks from undesired environmental hazards.

A further object of the invention is making available to users a foldable poultry brood box that is durable, easy to use, easy to secure in position, is inexpensive to manufacture, and is easy to deploy, to use, to move, and after use conveniently to collapse, to store for possible future reuse, or to dispose.

The invention can be used in other areas of animal husbandry to provide a sheltered environment for other young animals such as puppies, kittens, rabbits, or other small animals.

Additional and various other objects and advantages attained by the invention will become more apparent as the specification is read and the accompanying figures are reviewed.

DETAILED DESCRIPTION OF THE INVENTION

Figure 1:
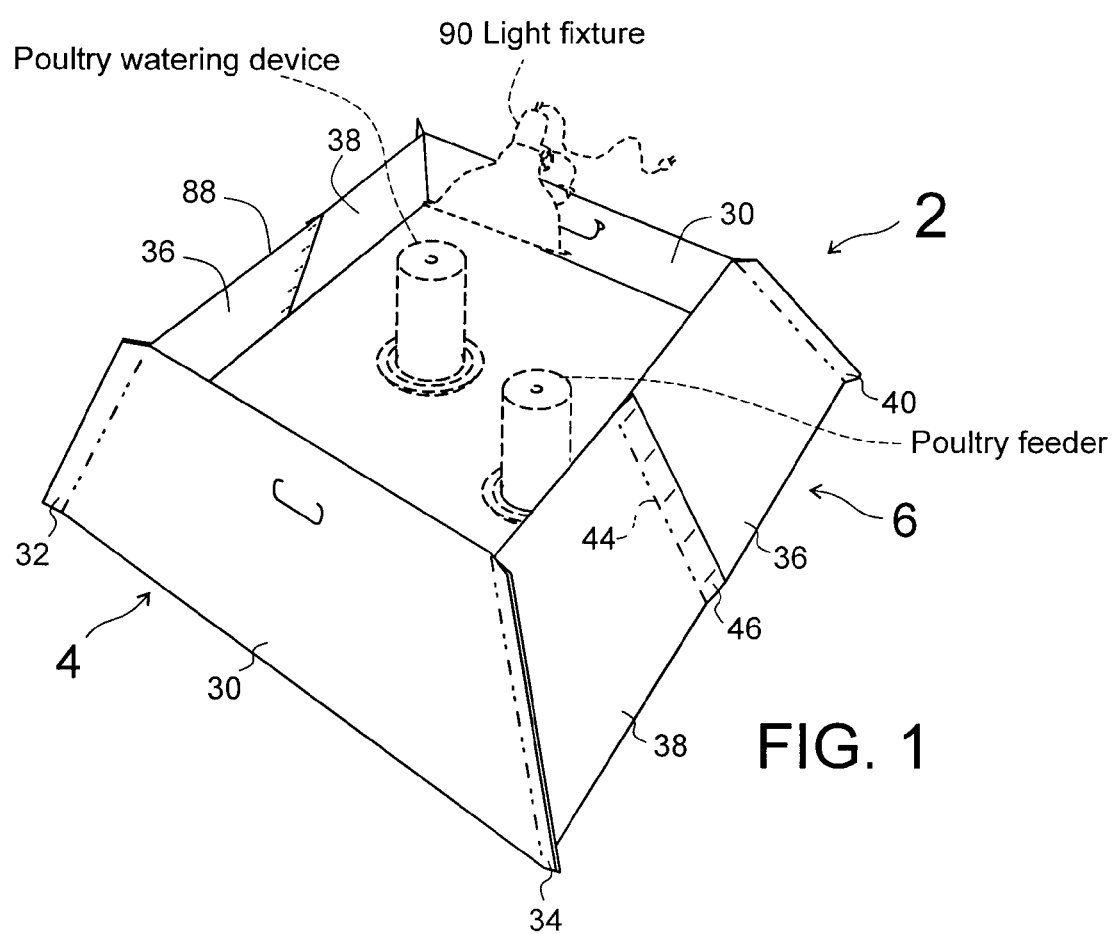
FIG. 1 is a perspective view of a foldable poultry brood box 2 having a foldable bottom in a deployed condition and showing a poultry watering device and poultry feeder within said brood box and a light fixture attached along an upper inner perimeter opening 88 along a top edge of an endwall 30 of the brood box (the interior floor area of the brood box covered with a suitable poultry bedding material)
Figure 2:
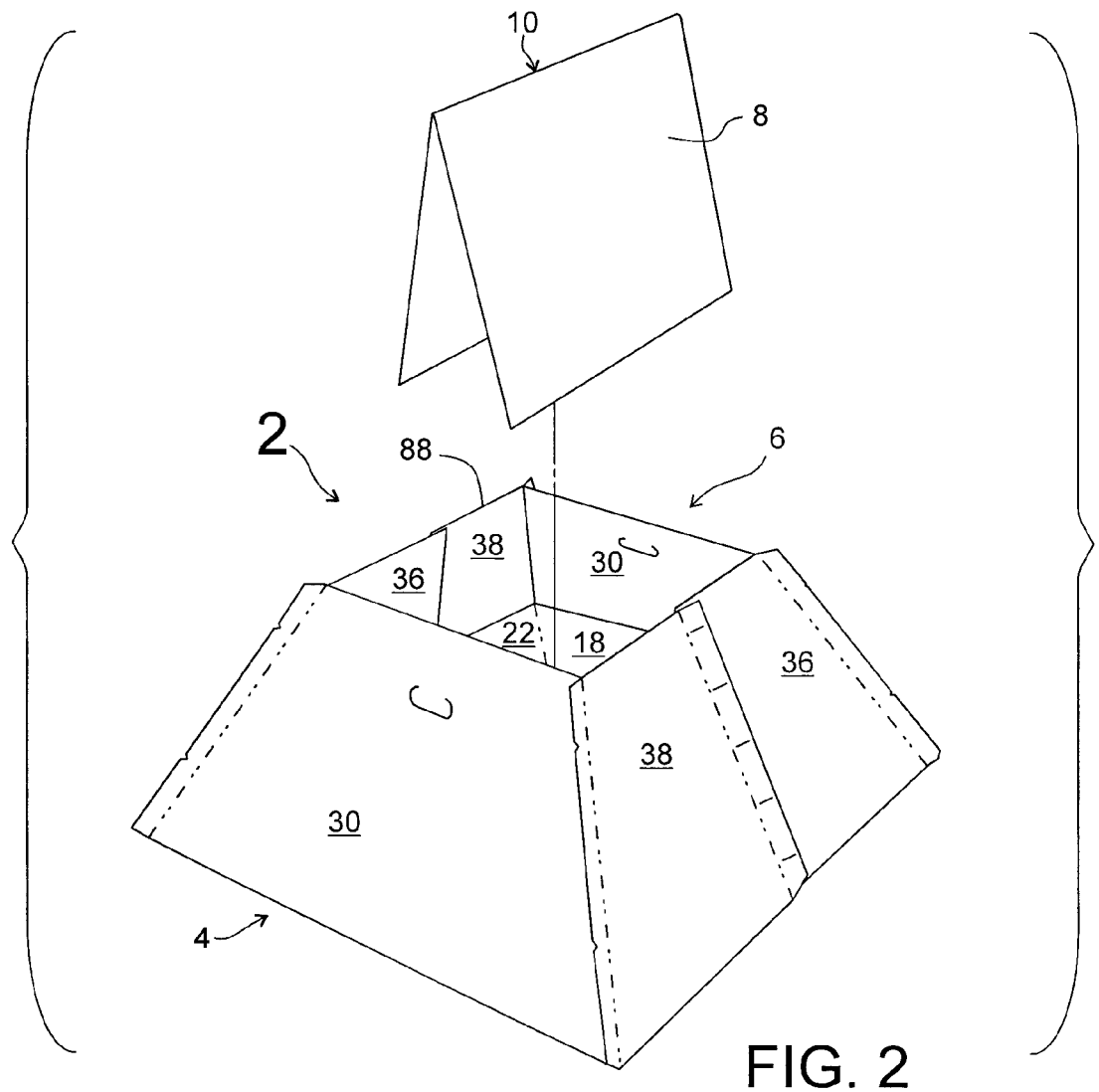
FIG. 2 is a partially exploded perspective view of the foldable poultry brood box 2 shown in FIG. 1 having a floor overlay insert 8 having a transverse fold line 10 and showing said overlay insert positioned above two foldably connected brood box blanks 4 and 6.
Figure 3:
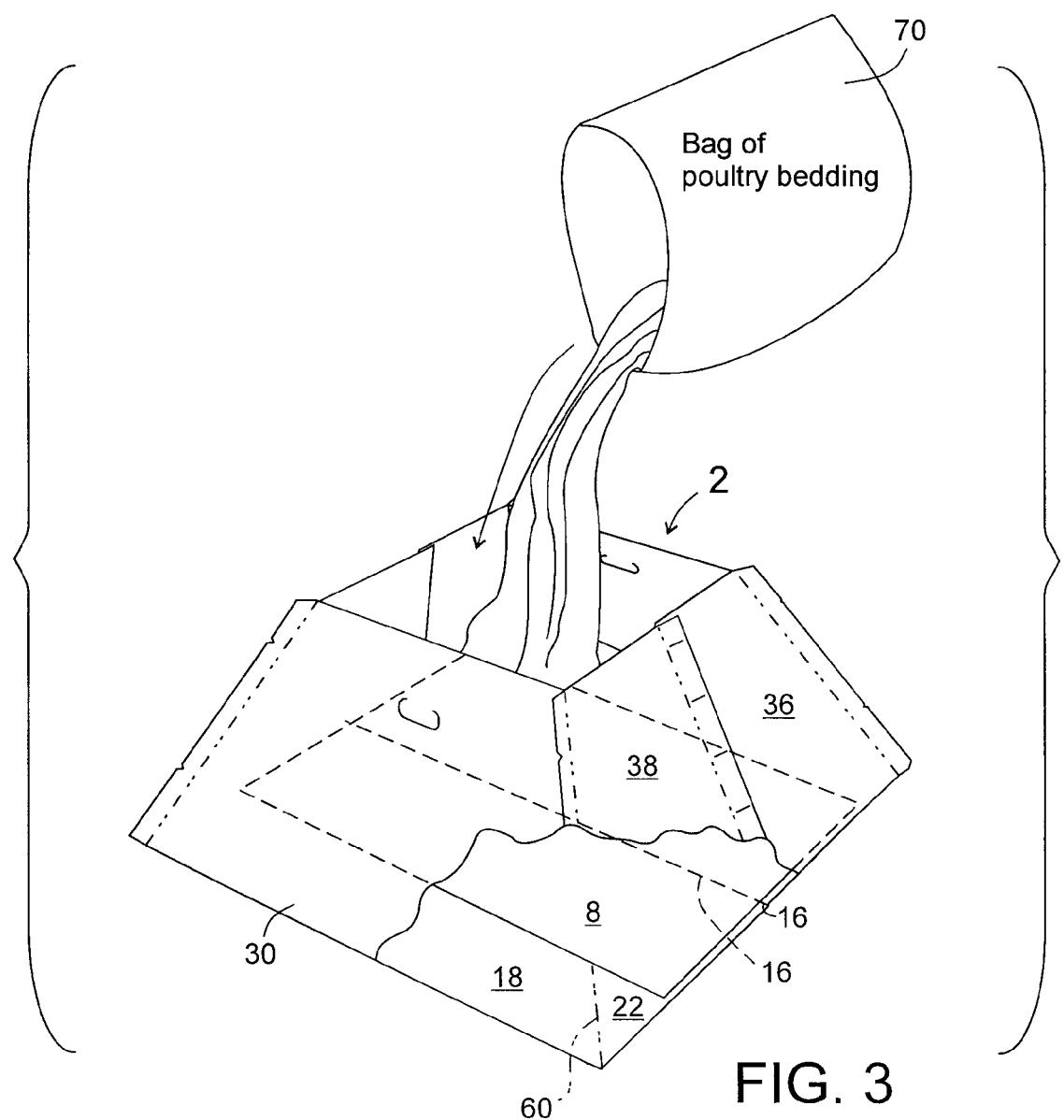
FIG. 3 is a partially cutaway perspective view of the foldable poultry brood box 2 shown in FIG. 2 and depicting the pouring of a poultry bedding material from a bag 70 into said brood box to cover the interior floor area of the box and to cover the floor overlay insert 8 disposed within and overlaying adjacent floor-length floor free edges 16.

A foldable poultry brood box 2, 302, 412, 502 comprises two duplicate, congruent half brood box blanks 4 and 6, 304 and 306, 414 and 416, 504 and 506 operatively and foldably connected together one blank to the other blank;

each said brood box blank comprising a three-panel rectangular floor 14, 14a, or 14' having a floor-length floor free edge 16 and a floor-length isosceles right triangular panel 18 foldably connected respectively along each leg to one of two flanking isosceles right triangular panels 20, 22 each foldably connected to said floor-length isosceles right triangular panel and each having a hypotenuse respectively congruent and along one of the legs of said floor-length isosceles right triangular panel and a respective free leg of each said flanking isosceles right triangular panel forming a half of said floor free edge;

an integral isosceles trapezoidal endwall 30, 330, 430, 530 having two endwall angled leg edges, an endwall smaller base free edge, and an endwall larger base edge, said endwall larger base edge congruent and foldably connected to said floor along the hypotenuse of said floor-length isosceles right triangular panel and said endwall extending outward from said floor;

and two integral right trapezoidal sidewalls 36 and 38, 336 and 338, 436 and 438, 536 and 538 each sidewall having a sidewall smaller base free edge, a sidewall angled leg edge adjacent congruent and foldably connected to one of said endwall angled leg edges, a sidewall perpendicular leg free edge away from said endwall, and a sidewall larger base edge, each said sidewall larger base edge congruent and foldably connected to said floor along a leg of one of said respective flanking isosceles right triangular panels and each said sidewall respectively extending outward from said floor; and said two brood box blanks aligned to one another with respective said floor-length floor free edges adjacent one another and with respective sidewall perpendicular leg free edges of one said box blank operatively and foldably connected to respective adjacent congruent said sidewall perpendicular leg free edges of the other said box blank; and said endwall smaller base free edges of said endwalls and said sidewall smaller base free edges of said sidewalls together defining an upper inner perimeter opening 88 in said brood box.

As shown in FIGS. 4, 12, 13, 17, 23, and 24, each brood box blank 4, 6, 304, 306, 414, 416, 504, and 506 has nine blank fold lines 48, 50, 52, 54, 56, 58, 60, 62, 64 and two joining tab die cuts 76; and preferably each box blank has at least one handhold die cut 82 defining a handhold flap 84 in each said endwall and one or more pairs of cooperating joining tab alignment indexing notches 86 distributed selectively along adjacent joining tab free edges.

The best embodiment of the foldable poultry brood box 502 includes a rectangular floor overlay insert 8 having a transverse fold line 10 that is inserted and retained within a deployed brood box to overlay portions of the floor free edges and portions of the two rectangular floors of said deployed brood box.

Preferably, each endwall has two flanking endwall corner joining tabs 32, 34 foldably connected to said endwall along a respective endwall angled leg that can be connected to a cooperating adjacent sidewall corner joining tab 40, 42 attached to each sidewall along a sidewall angled leg edge.

A brood box blank can have a transverse sidewall hinge line 44 in one of the sidewalls 38, 338, 438, 538 and an associated sidewall hinging overlap tab 46 extending across and beyond said sidewall hinge line from said sidewall.

Preferably, when a poultry brood box is in a deployed condition, a bag of poultry bedding 70 can be used to dispense a layer of bedding within said brood box to cover an interior floor area of said brood box.

Preferably when a brood box is used in a deployed condition, a light fixture 90 is mounted to an upper inner perimeter of a brood box to illuminate and generally provide a source of warmth into said brood box and a light fixture reinforcement overlay panel 92 having a plurality of light fixture securement apertures 94, 96 can be attached overlaying a portion of the upper inner perimeter of the brood box to provide a mounting surface for said light fixture and provide apertures that can cooperate with said light fixture securement device 98 (zip ties, cord, wire, or other suitable tie) to secure the fixture to the brood box during use.

Figure 4:
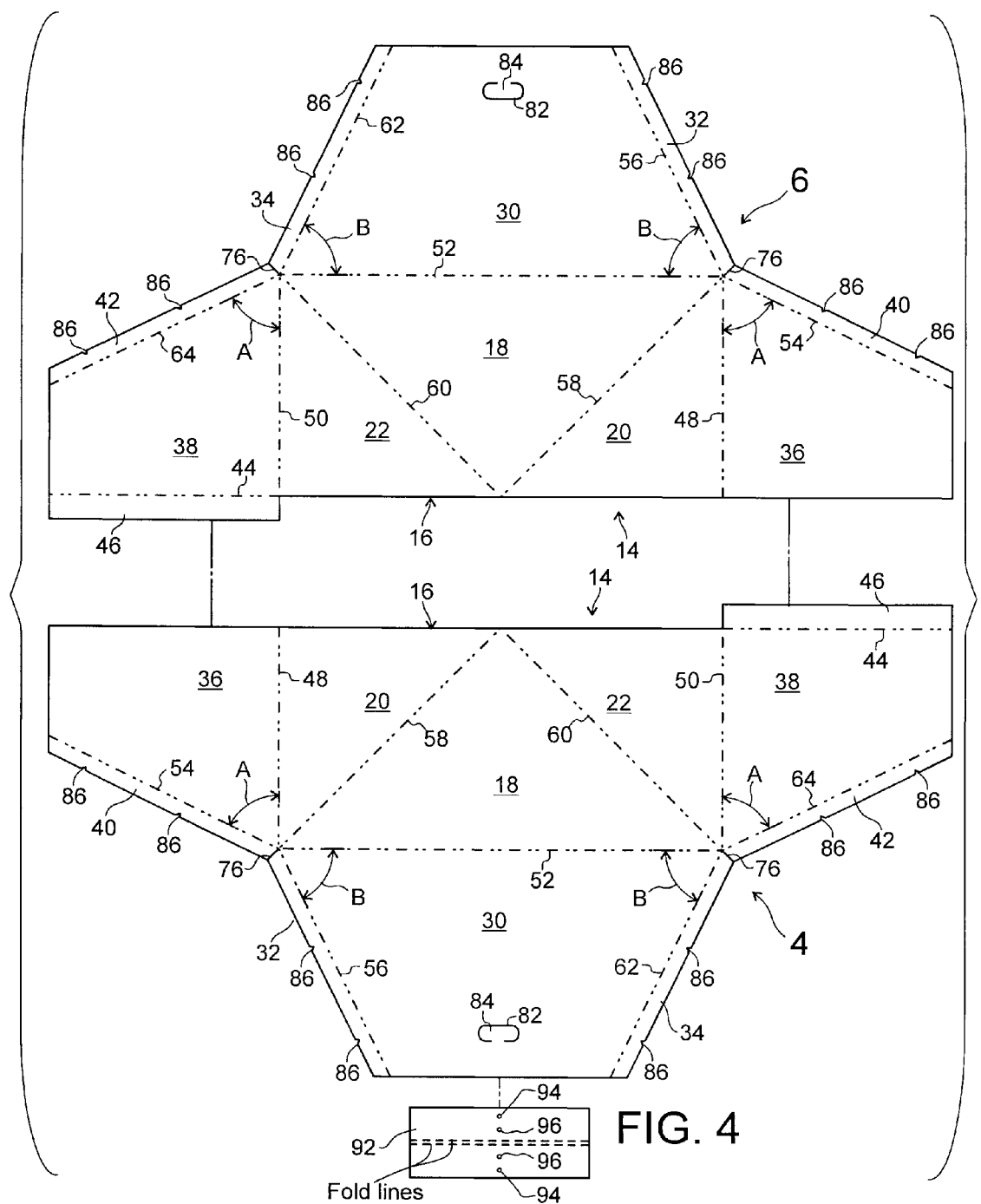
FIG. 4 is an exploded top plan view of the foldable poultry brood box 2 having two duplicate, congruent half brood box blanks 4 and 6 and showing a light fixture reinforcement overlay panel 92 having preferably a plurality of light fixture securement apertures 94, 96 for receiving a securement device threaded through the apertures and through an overlaid portion of said brood box to help secure a lamp fixture to the brood box (the floor overlay insert 8 is not shown; and zip tie or wire or other securement device not shown)
Figure 5:
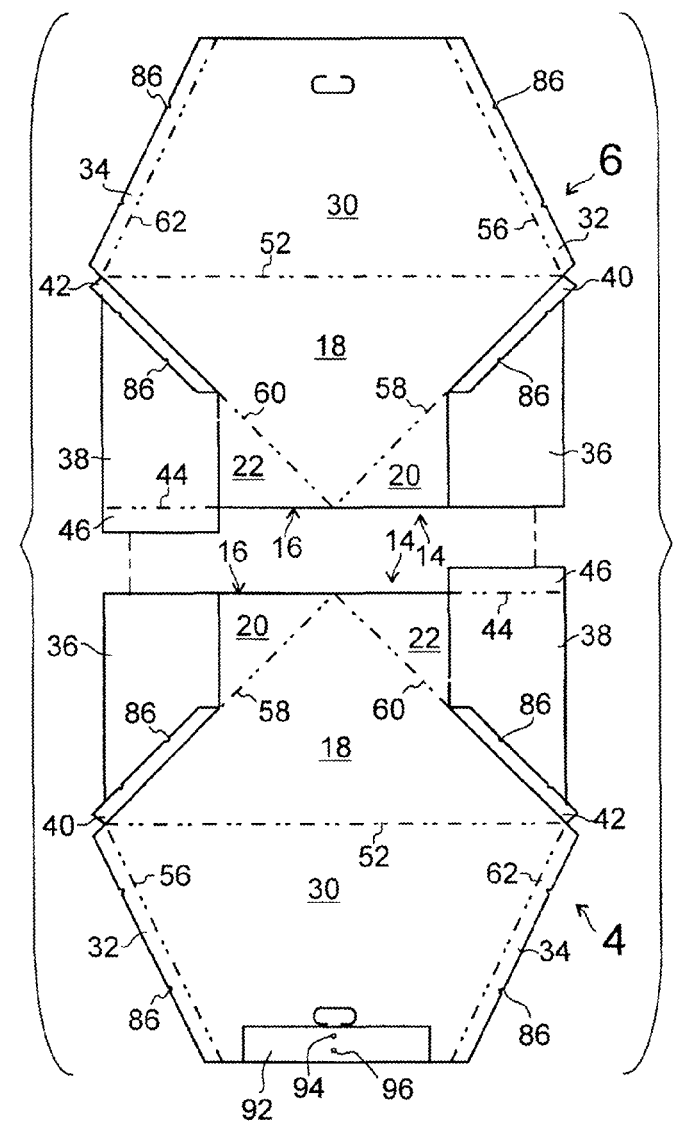
FIG. 5 is a partially exploded top plan view of said brood box blanks 4 and 6 shown in FIG. 4 with each said blank partially erected with respective sidewalls 36 and 38 folded upwardly from respective said floors 14 and two respective joining tabs 40 and 42 of each said blank folded outwardly away from each other into the same plane and showing said overlay panel 92 folded over and attached to an endwall smaller base free edge of an isosceles trapezoidal endwall 30.
Figure 6:
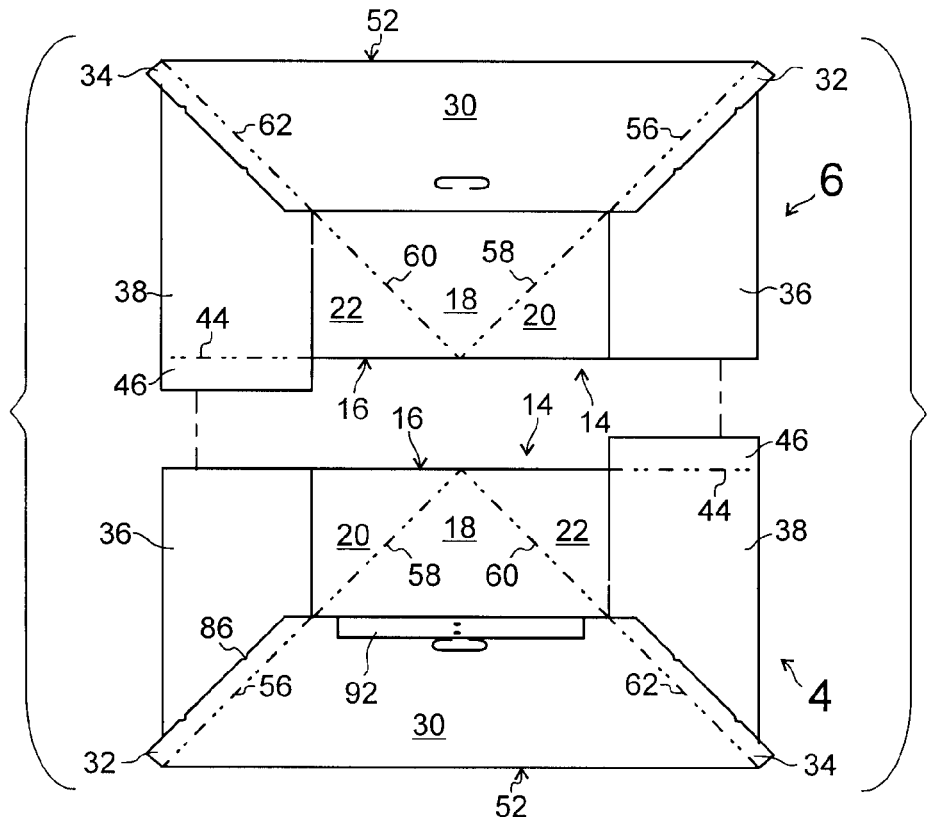
FIG. 6 is a partially exploded top plan view of said brood box blanks 4 and 6 shown in FIG. 5 with each said blank erected with respective sidewalls 36 and 38 folded upwardly from respective said floors 14 and respective said endwalls 30 folded upwardly from respective said floors and said endwalls foldably connected by joining means to respective said sidewalls.
Figure 7:
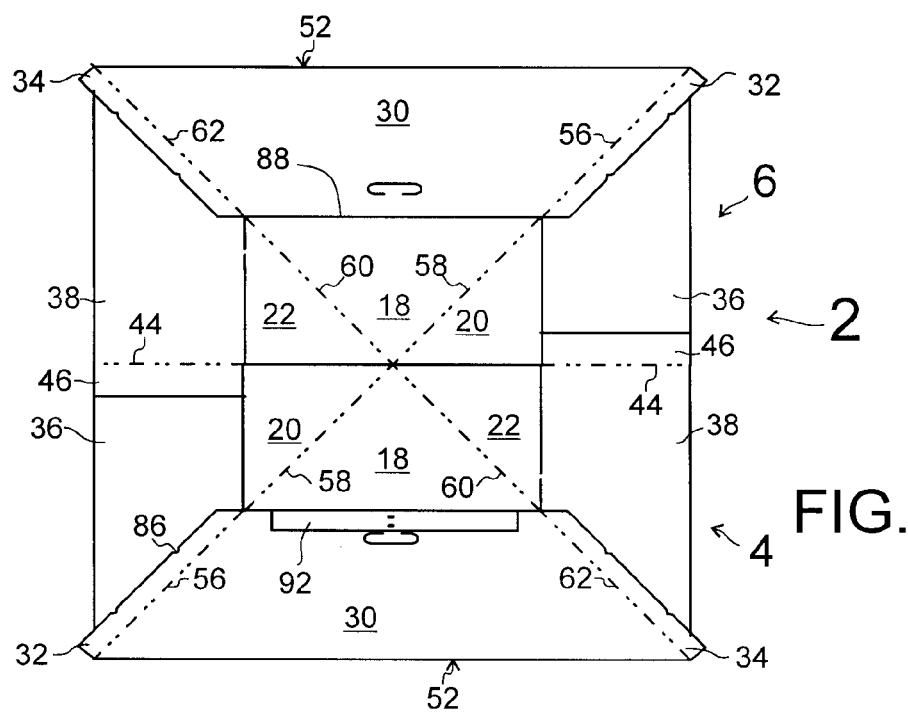
FIG. 7 is a top plan view of a brood box 2 comprising said brood box blanks 4 and 6 shown in FIG. 6 with each said blank erected with respective sidewalls 36 and 38 folded upwardly from respective said floors 14 and respective said endwalls 30 folded upwardly from respective said floors and said endwalls foldably connected by joining means to respective said sidewalls; and said sidewall 38 of each said blank foldably connected by joining means to said sidewall 36 of the other said blank (the floor overlay insert 8 is not shown)
Figure 8:
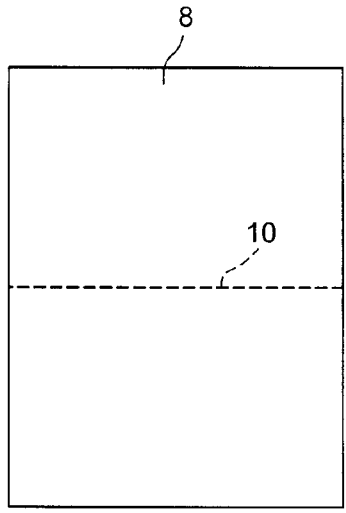
FIG. 8 is a top plan view of a floor overlay insert 8 showing a transverse fold line 10.
Figure 9:
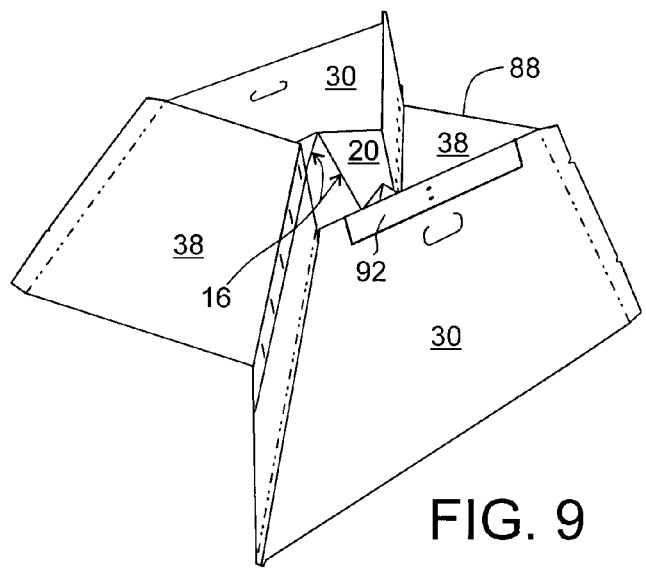
FIG. 9 is a perspective view of said two brood box blanks 4, 6 shown in FIG. 7 foldably connected together and partially folded towards a storage condition (the floor overlay insert 8 is not shown)
Figure 10:
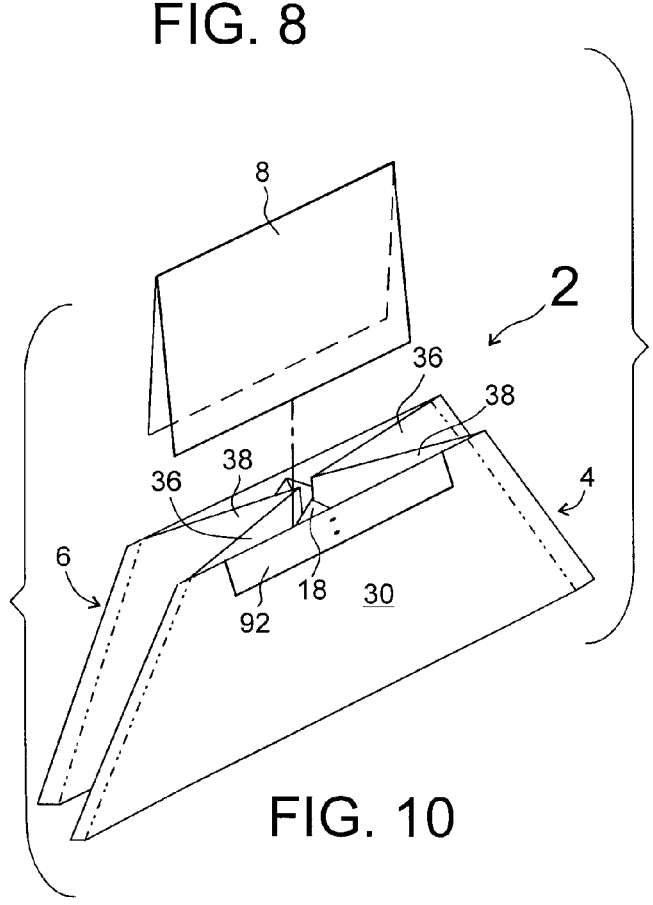
FIG. 10 is a partially exploded, perspective view of said two brood box blanks 4 and 6 foldably connected together and partially folded to a storage condition with respective said floors folding upwardly towards respective said endwalls and said sidewalls folding inwardly and said floor overlay insert 8 folded.
Figure 11:
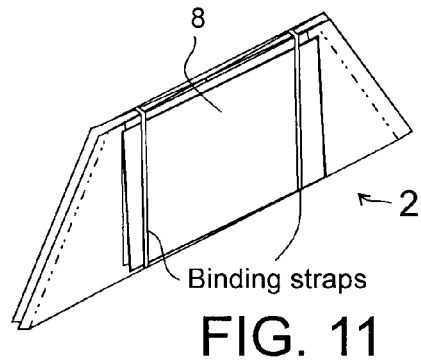
FIG. 11 is a perspective view of said brood box 2 shown in FIG. 10 with said foldably connected together blanks and said floor overlay insert 8 fully folded to a storage condition and strapped together by two binding straps.
Figure 12:
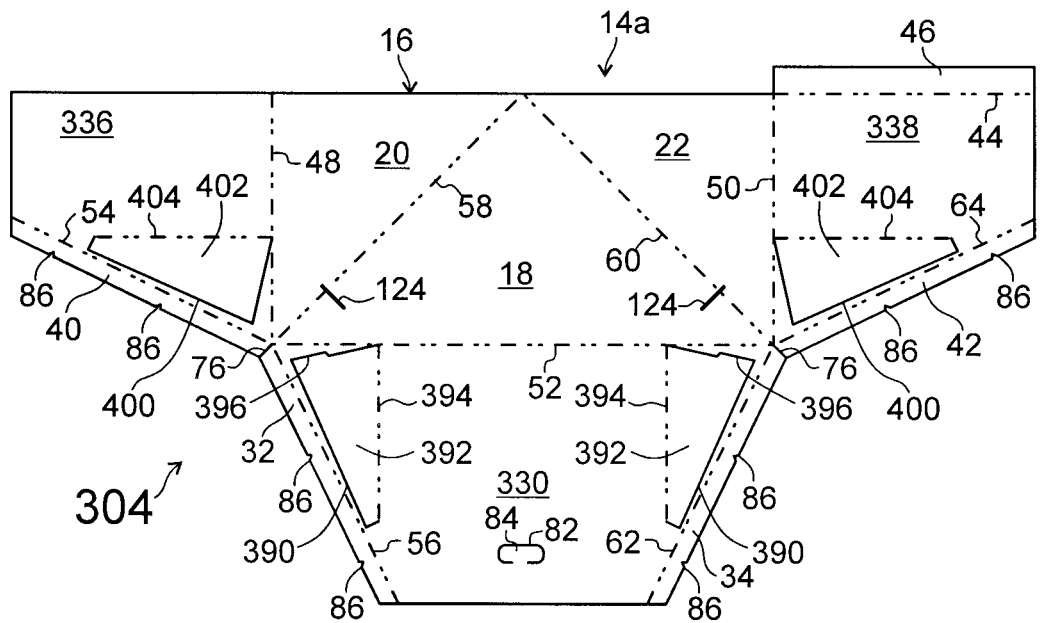
FIG. 12 is a top plan view of a second embodiment box blank 304 of a second embodiment of the invention (said second embodiment also includes a duplicate, congruent second embodiment box blank 306 (not shown) identical to said blank 304 and preferably has an overlay insert 8 not shown)
Figure 13:
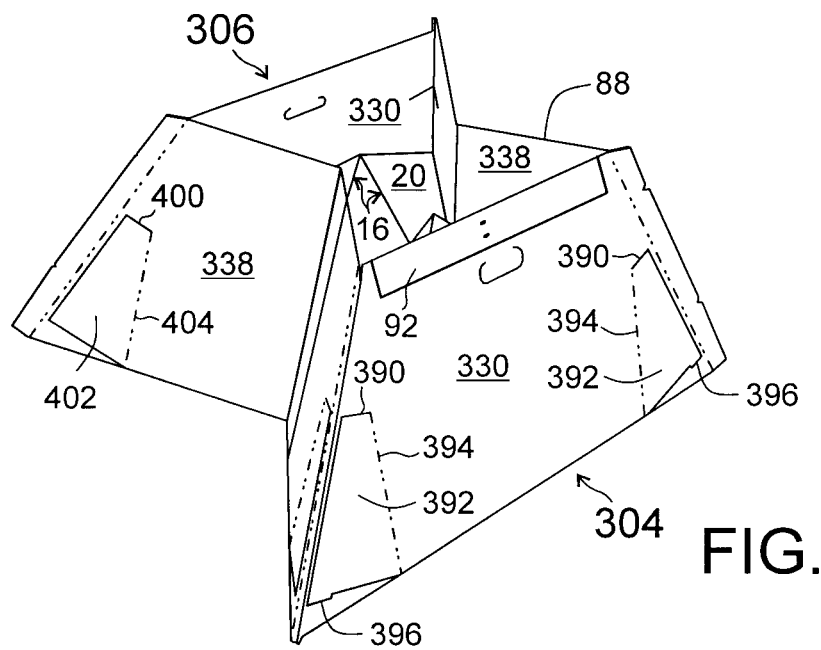
FIG. 13 is a perspective view of two second embodiment box blanks 304 and 306 foldably connected together by joining means and partially folded towards a storage condition (a floor overlay insert 8 is not shown)
Figure 14:
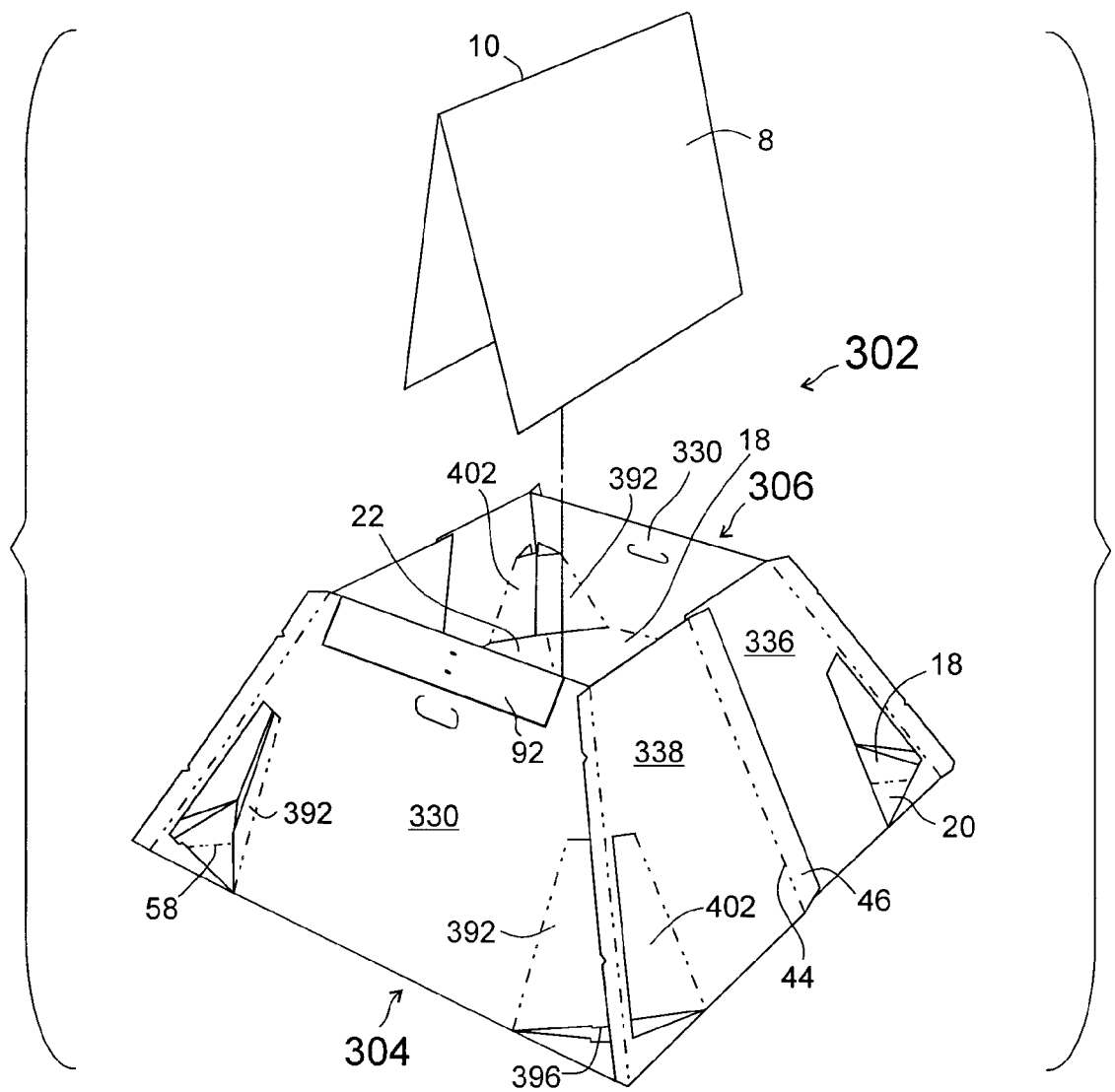
FIG. 14 is a partially exploded perspective view of said second embodiment of a foldable poultry brood box 302 having a floor overlay insert 8 and said overlay insert having a transverse fold line 10 and showing said overlay insert positioned above two foldably connected together brood box blanks 304 and 306 and showing a plurality of corner flaps folded inwardly.
Figure 15:
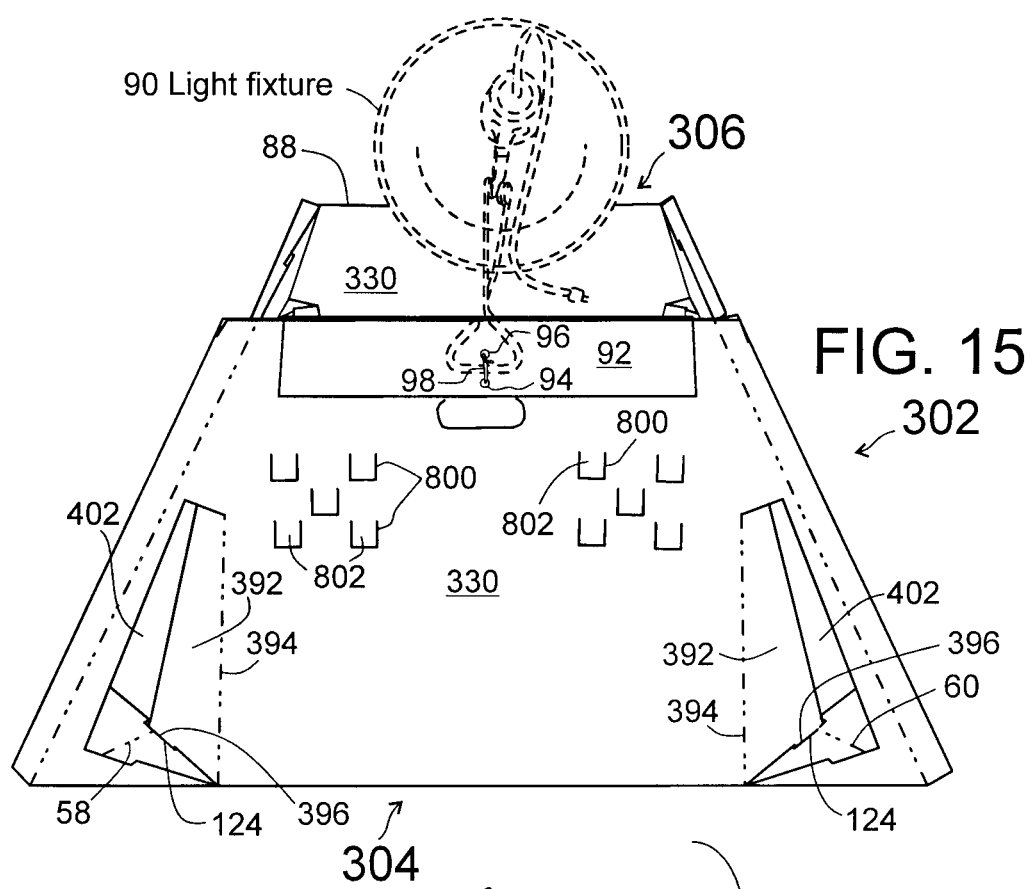
FIG. 15 is a perspective view of said second embodiment of said foldable poultry brood box 302 shown in FIG. 14 in a deployed condition (fully erect) showing a light fixture 90 (for illumination and provision of warmth into said brood box) attached to a light fixture reinforcement overlay 92 along an upper inner perimeter opening 88 of said brood box attached to the endwall 330 and secured by a light fixture securement device 98 and showing two sets of respective cooperating corner flaps 392 and 402 in said brood box blank 304 with each said set in a partially overlapping condition secured in place by a respective endwall corner flap anchor tab 396 inserted within and retained within a respective cooperating corner flap retaining slot 124.
Figure 16:
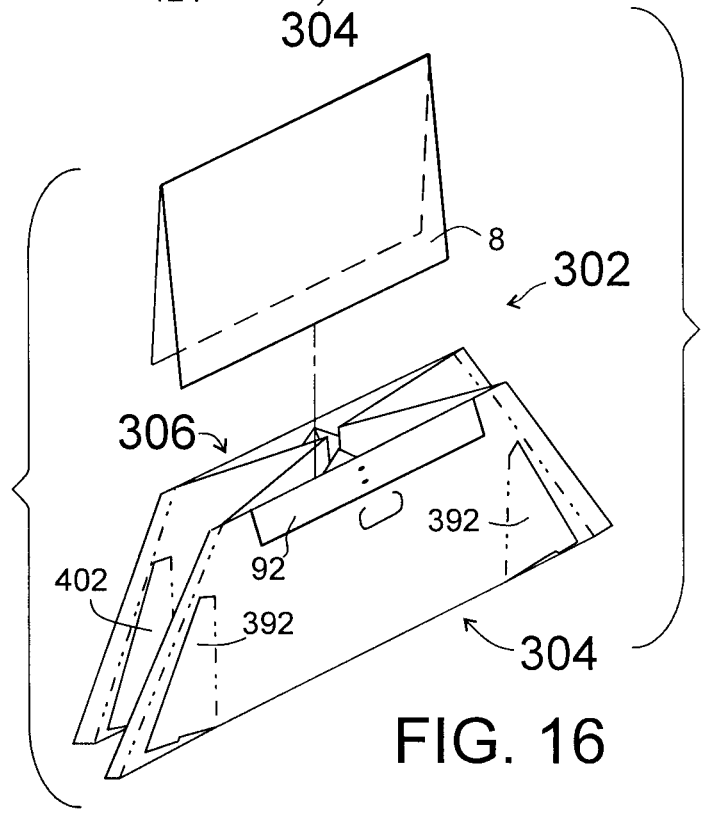
FIG. 16 is a partially exploded, perspective view of said brood box 302 shown in FIG. 15 partially folded towards a storage condition with respective said floors folding upwardly towards respective said endwalls and said sidewalls folding inwardly towards one another and said floor overlay insert 8 folded.
Figure 17:
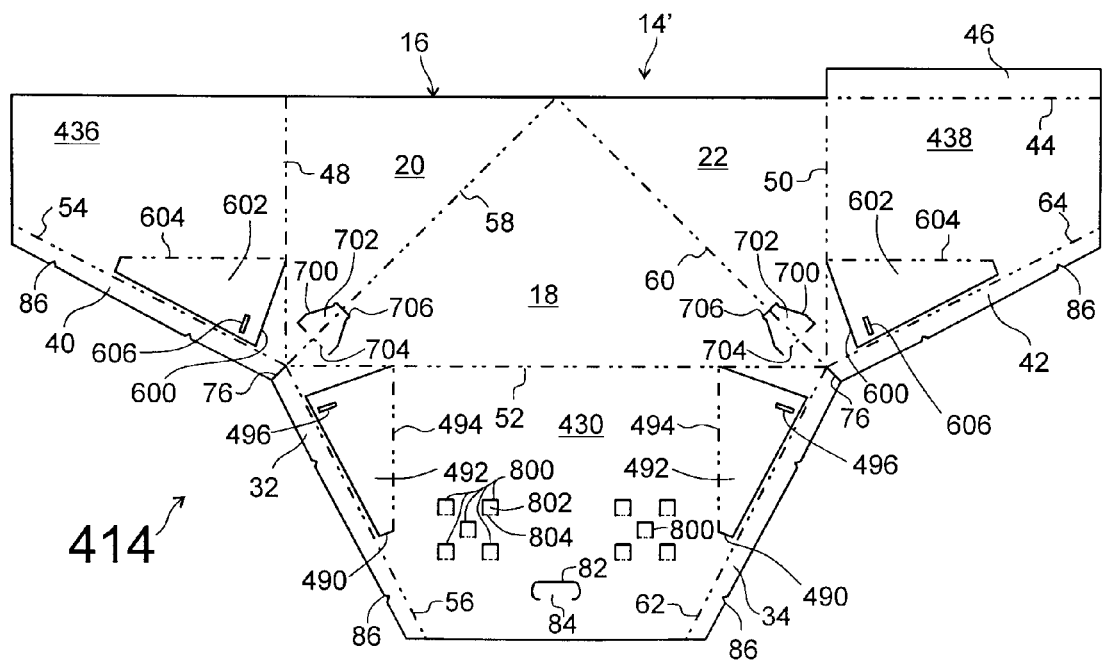
FIG. 17 is a top plan view of a third embodiment box blank 414 of a third embodiment of the invention (said third embodiment also includes a duplicate, congruent third embodiment box blank 416 identical to said blank 414 and an overlay insert 8 not shown)
Figure 18:
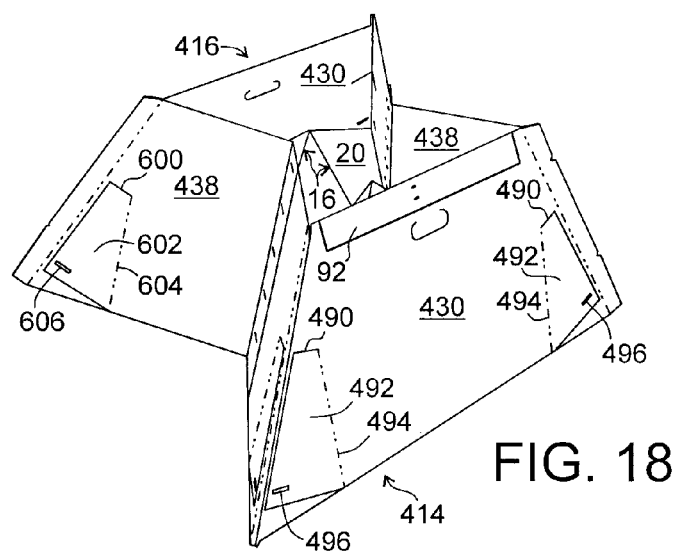
FIG. 18 is a perspective view of two third embodiment box blanks 414 and 416 foldably connected together by joining means and partially folded towards a storage condition (a floor overlay insert 8 is not shown)
Figure 19:
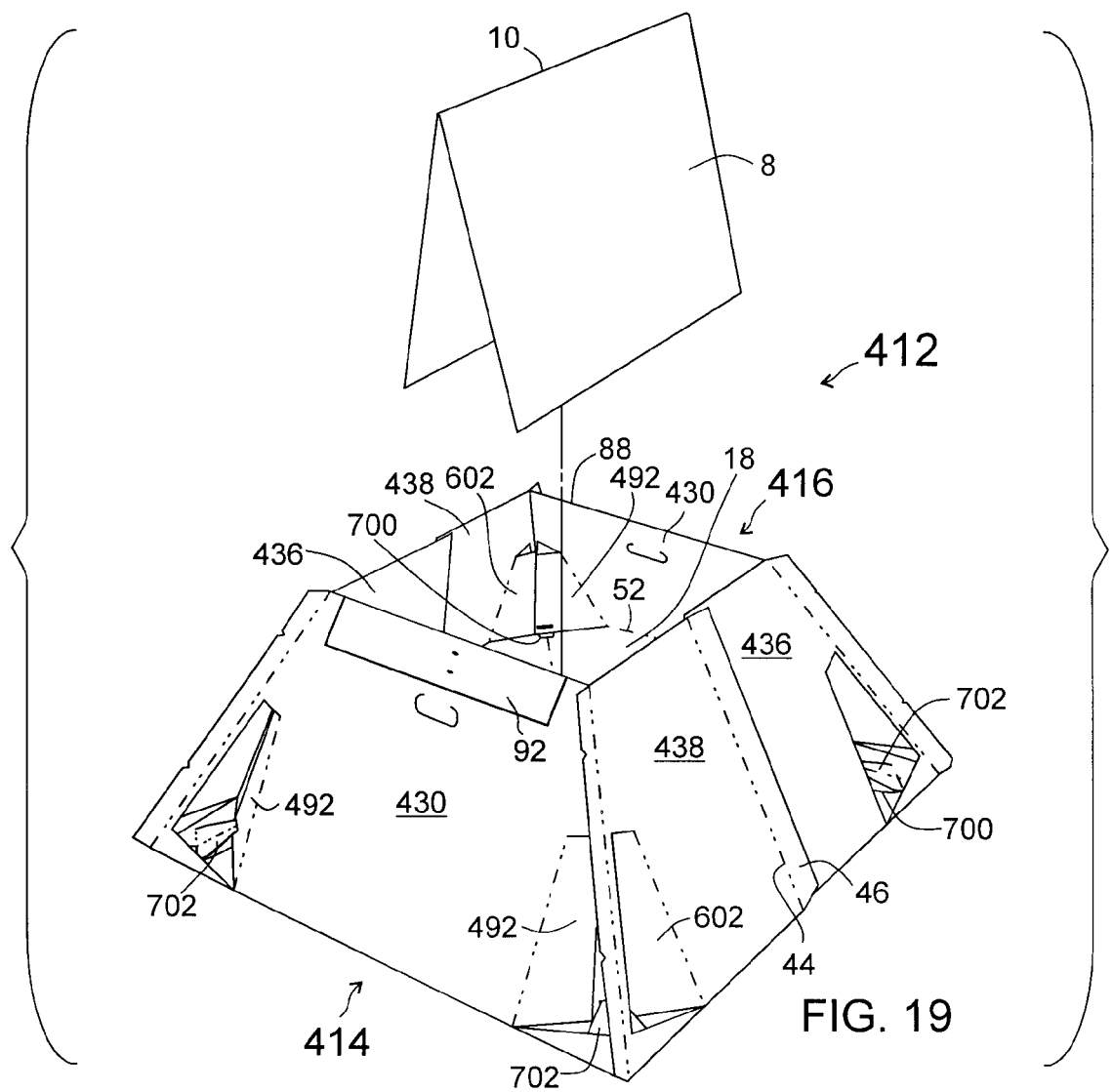
FIG. 19 is a partially exploded perspective view of said third embodiment of a foldable poultry brood box 412 having a floor overlay insert 8 and said overlay insert having a transverse fold line 10 and showing said overlay insert positioned above two foldably connected brood box blanks 414 and 416 and showing a plurality of corner flaps folded inwardly.
Figure 20:
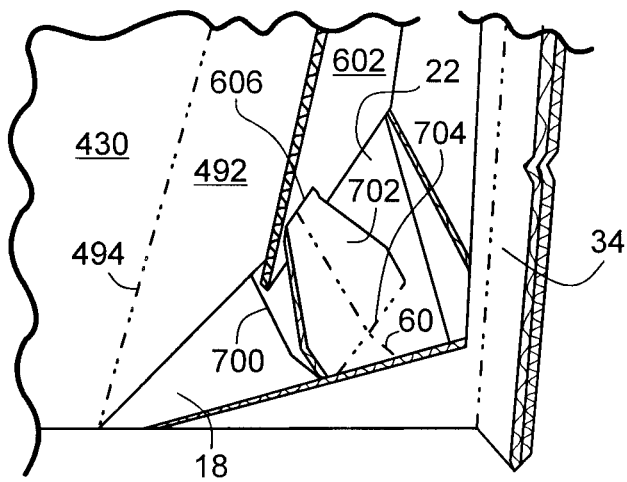
FIG. 20 is a partial perspective outside view of said third embodiment of said brood box 412 in a deployed condition and showing an endwall corner flap 492 folded inwardly along a fold line 494 to partially underlay a folded inwardly sidewall corner flap 602 having a sidewall corner flap bracing strut anchor hole 606 and showing a floor corner bracing strut 702 formed by a strut die cut 700 in a floor corner away from the floor free edge and folded upwardly and received in the sidewall corner flap bracing strut anchor hole.
Figure 21:
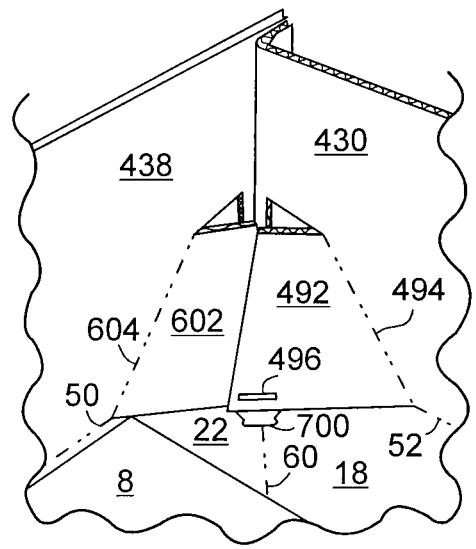
FIG. 21 is a partial perspective inside view of said brood box 412 shown in FIG. 20 showing an endwall corner flap 492 folded inwardly along a fold line 494 to partially underlay when viewed from the outside of said box a folded inwardly sidewall corner flap 602.
Figure 22:
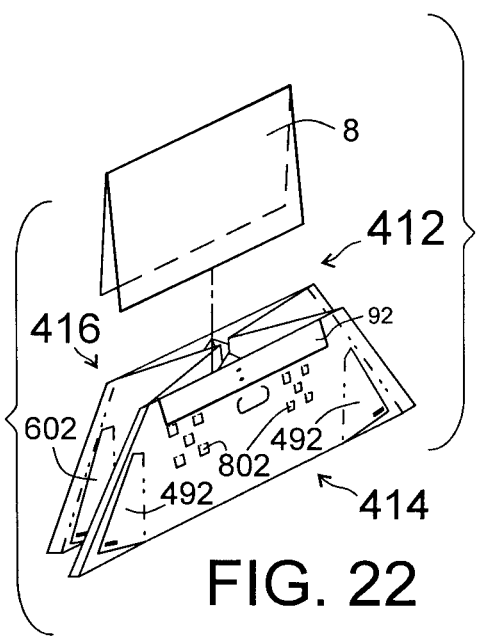
FIG. 22 is a partially exploded, perspective view of said brood box 412 shown in FIG. 19 partially folded towards a storage condition with respective said floors folding upwardly towards respective said endwalls and said sidewalls folding inwardly towards one another and said floor overlay insert 8 folded.
Figure 23:
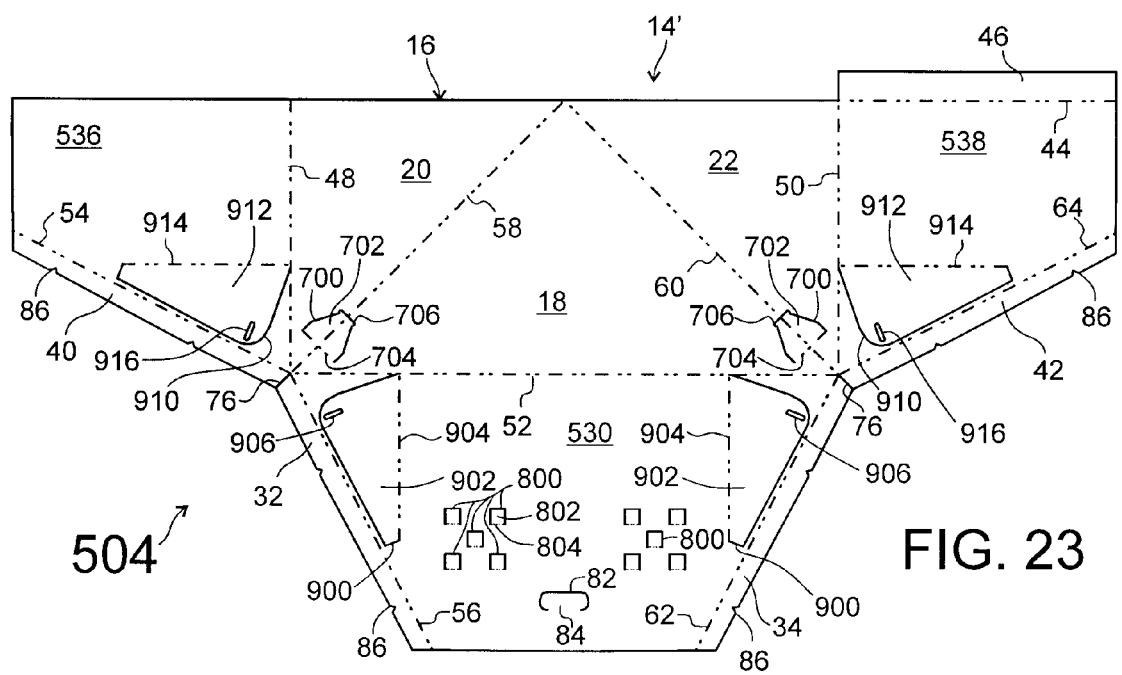
FIG. 23 is a top plan view of a fourth embodiment box blank 504 of a fourth and best embodiment of the invention (said fourth embodiment also includes a duplicate, congruent fourth box blank 506 (shown in FIG. 24) identical to said blank 504 and preferably has an overlay insert 8 not shown)
Figure 24:
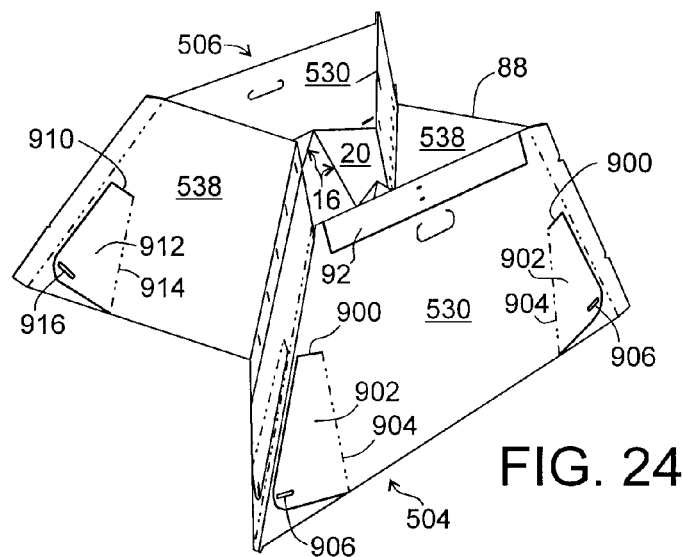
FIG. 24 is a perspective view of two fourth embodiment box blanks 504 and 506 foldably connected together by joining means and partially folded towards a storage condition (a floor overlay insert 8 is not shown)
Figure 25:
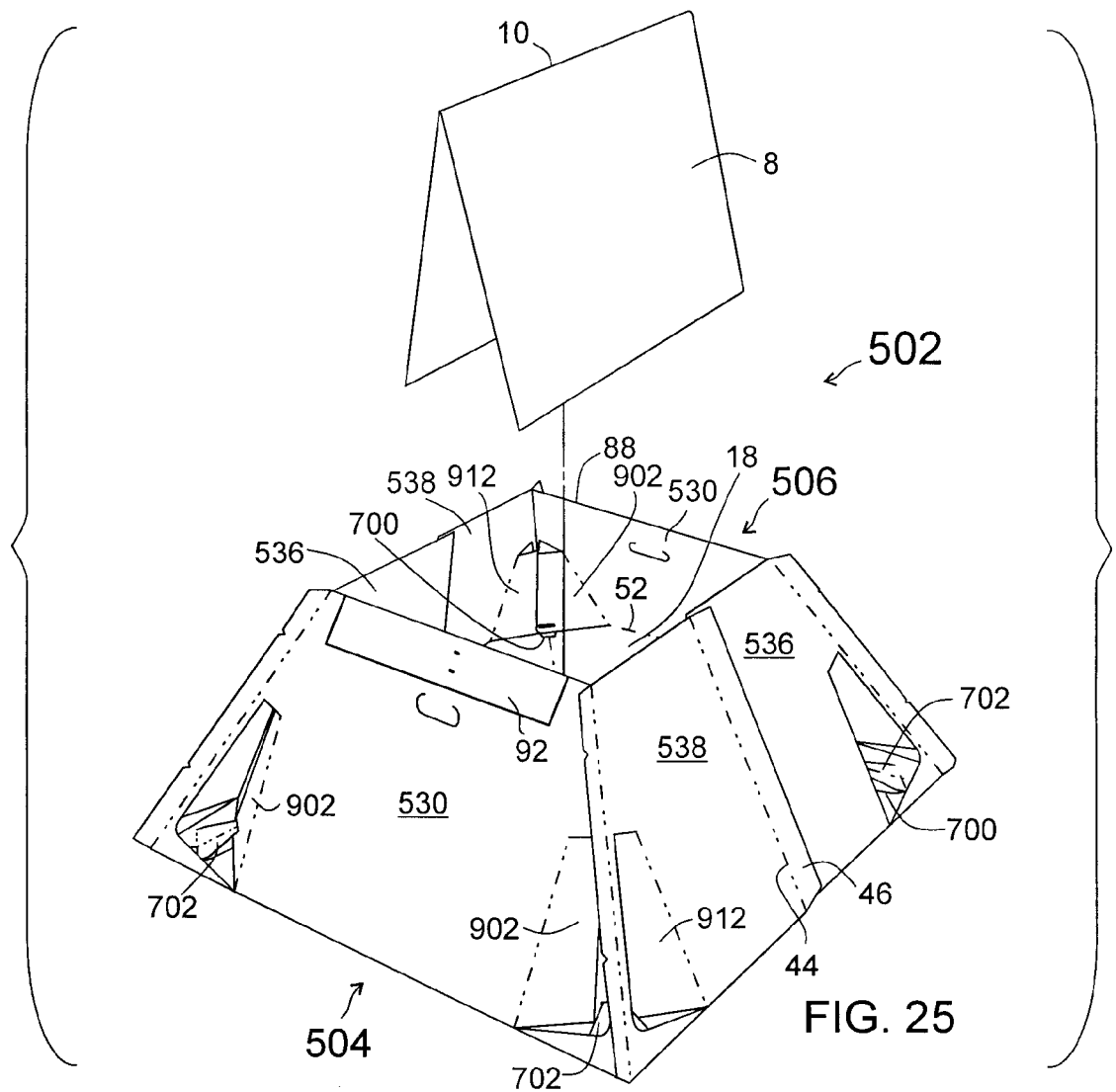
FIG. 25 is a partially exploded perspective view of said fourth embodiment of a foldable poultry brood box 502 having a floor overlay insert 8 and said overlay insert having a transverse fold line 10 and showing said overlay insert positioned above two foldably connected brood box blanks 504 and 506 and showing a plurality of corner flaps folded inwardly.
Figure 26:
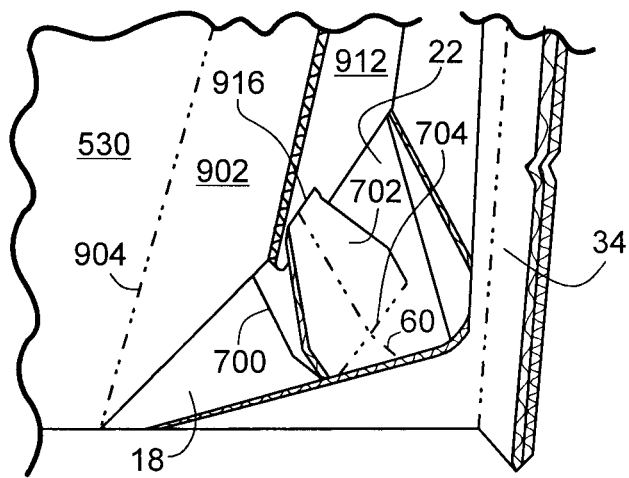
FIG. 26 is a partial perspective outside view of said fourth embodiment of said brood box 502 in a deployed condition and showing an endwall corner flap 902 folded inwardly along a fold line 904 to partially underlay a folded inwardly sidewall corner flap 912 having a sidewall corner flap bracing strut anchor hole 916 and showing a floor corner bracing strut 702 formed by a strut die cut 700 in a floor corner away from the floor free edge and folded upwardly and received in the sidewall corner flap bracing strut anchor hole.
Figure 27:
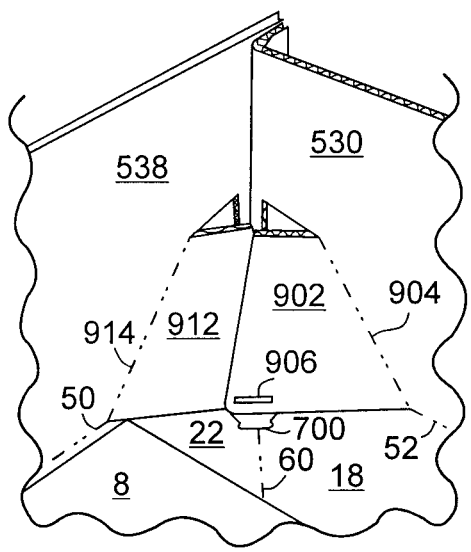
FIG. 27 is a partial perspective inside view of said brood box 502 shown in FIG. 26 showing an endwall corner flap 902 folded inwardly along a fold line 904 to partially underlay when viewed from the outside of said box a folded inward sidewall corner flap 912.
Figure 28:
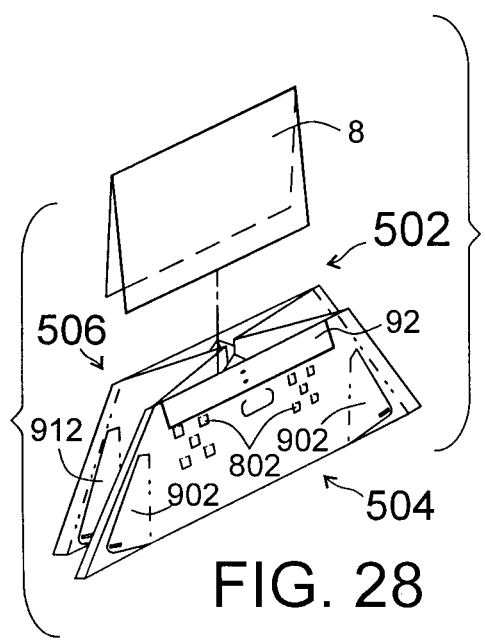
FIG. 28 is a partially exploded, perspective view of said brood box 502 shown in FIG. 25 partially folded towards a storage condition with respective said floors folding upwardly towards respective said endwalls and said sidewalls folding inwardly towards one another and said floor overlay insert 8 folded.

In FIG. 4, angle A indicates a base angle of said right isosceles trapezoidal sidewall and angle B indicates a base angle of said isosceles trapezoidal endwall; and preferably in each brood box embodiment the base angles of the endwall and the sidewall are equal angles.

In the best embodiment, staples connect the sidewalls to the endwalls, connect the sidewalls of one box blank to the other box blank, and connect the light fixture overlay panel to an endwall overlapping a portion of the upper inner perimeter of the brood box. Joining means used in connecting elements of the brood box can be staples, adhesive tape, stitching, glue, rivets (plastic or metal), zip ties, a plurality of interlocking insertable tabs of one element inserted into and retained within respective cooperating receiving apertures of a second element, or another suitable joining means.

In a second embodiment of the brood box 302, as shown in FIGS. 12 to 16, each brood box blank 304, 306 has an alternative rectangular floor 14a that in addition to having all of the elements of the basic embodiment floor 14 having two corner flap retaining slots 124 each said respective retaining slot located in a respective one of two interior corners of said alternative rectangular floor away from said floor free edge 16 and proximate a respective leg of said larger isosceles right triangular panel 18;

has an alternative endwall 330 that in addition to having all of the elements of the basic embodiment endwall 30 having two endwall corner flap die cuts 390 each located proximate said respective endwall angled leg edges, each forming a respective swinging door-like sail-shaped pivotable endwall corner flap 392 having a lower distal endwall corner flap anchor tab 396 proximate said floor, and a respective proximal endwall corner flap fold line 394 perpendicular to said endwall larger base edge, each respective said endwall corner flap pivotable about said respective endwall corner flap fold line inwardly towards said floor free edge 16 and for said respective anchor tab selectively to engage and be anchored in said respective flap retaining slot; and has two alternative sidewalls 336, 338 that in addition to having all of the elements of the basic embodiment sidewalls 36, 38 each said alternative sidewall having a sidewall corner flap die cut 400 located proximate said sidewall angled leg edge, each sidewall corner flap die cut forming a swinging door-like sail-shaped pivotable sidewall corner flap 402 proximate said floor having a proximal sidewall corner flap fold line 404 perpendicular to said sidewall larger base edge, said sidewall corner flap pivotable about said sidewall corner flap fold line inwardly towards said floor free edge 16 to be selectively anchored behind said endwall corner flap.

In a third embodiment of the brood box 412, as shown in FIGS. 17 to 22, each brood box blank 414, 416 has an alternative rectangular floor 14' that in addition to having all of the elements of the basic embodiment floor 14 having two floor corner bracing strut die cuts 700 each said respective bracing strut die cut located in a respective one of two interior corners of said alternative rectangular floor away from said floor free edge 16 and proximate a respective leg of said larger isosceles right triangular panel 18 and each said bracing strut die cut forming a respective pivotable floor corner bracing strut 702 having a bracing strut free end 706 and a respective proximal bracing strut fold line 704 perpendicular and across said respective leg of said larger isosceles right triangular panel, each respective said bracing strut pivotable about said respective strut fold line upwardly;

has an alternative endwall 430 that in addition to having all of the elements of the basic embodiment endwall 30 having two alternative endwall corner flap die cuts 490 each located proximate said respective endwall angled leg edges, each forming a respective swinging door-like sail-shaped pivotable endwall corner flap 492 having a lower distal angled corner and a lower distal endwall corner flap anchor hole 496 proximate said floor, and a respective proximal endwall corner flap fold line 494 perpendicular to said endwall larger base edge, each respective said endwall corner flap pivotable about said respective endwall corner flap fold line inwardly towards said floor free edge 16 and for said respective anchor hole selectively to engage and be anchored by said respective bracing strut free end of respective said bracing strut; and has two alternative sidewalls 436, 438 that in addition to having all of the elements of the basic embodiment sidewalls 36, 38 each said alternative sidewall having a sidewall corner flap die cut 600 located proximate said sidewall angled leg edge, each sidewall corner flap die cut forming a swinging door-like sail-shaped pivotable sidewall corner flap 602 having a lower distal angled corner and a lower distal sidewall corner flap anchor hole 606 proximate said floor and a proximal sidewall corner flap fold line 604 perpendicular to said sidewall larger base edge, said sidewall corner flap pivotable about said sidewall corner flap fold line inwardly towards said floor free edge 16 for said respective anchor hole selectively to engage and be anchored by said respective bracing strut.

In a fourth and best embodiment of the brood box 502, as shown in FIGS. 23 to 28, each brood box blank 504, 506 has an alternative rectangular floor 14' that in addition to having all of the elements of the basic embodiment floor 14 having two floor corner bracing strut die cuts 700 each said respective bracing strut die cut located in a respective one of two interior corners of said alternative rectangular floor away from said floor free edge 16 and proximate a respective leg of said larger isosceles right triangular panel 18 and each said bracing strut die cut forming a respective pivotable floor corner bracing strut 702 having a bracing strut free end 706 and a respective proximal bracing strut fold line 704 perpendicular and across said respective leg of said larger isosceles right triangular panel, each respective said bracing strut pivotable about said respective strut fold line upwardly;

has an alternative endwall 530 that in addition to having all of the elements of the basic embodiment endwall 30 having two alternative endwall corner flap die cuts 900 each located proximate said respective endwall angled leg edges, each forming a respective swinging door-like sail-shaped pivotable endwall corner flap 902 having a lower distal rounded corner and a lower distal endwall corner flap anchor hole 906 proximate said floor, and a respective proximal endwall corner flap fold line 904 perpendicular to said endwall larger base edge, each respective said endwall corner flap pivotable about said respective endwall corner flap fold line inwardly towards said floor free edge 16 and for said respective anchor hole selectively to engage and be anchored by said respective bracing strut; and has two alternative sidewalls 536, 538 that in addition to having all of the elements of the basic embodiment sidewalls 36, 38 each said alternative sidewall having a sidewall corner flap die cut 910 located proximate said sidewall angled leg edge, each sidewall corner flap die cut forming a swinging door-like sail-shaped pivotable sidewall corner flap 912 having a lower distal sidewall corner flap anchor hole 916 proximate said floor and a proximal sidewall corner flap fold line 914 perpendicular to said sidewall larger base edge, said sidewall corner flap pivotable about said sidewall corner flap fold line inwardly towards said floor free edge 16 for said respective anchor hole selectively to engage and be anchored by said respective bracing strut.

Each embodiment of the brood box invention may have a plurality of vent flap die cuts 800 selectively distributed across said endwalls forming a plurality of pivotable vent flaps 802 that can be pivoted about a respective plurality of vent flap fold lines 804.

The preceding description and exposition of the invention is presented for purposes of illustration and enabling disclosure. It is neither intended to be exhaustive nor to limit the invention to the precise forms disclosed. Modifications or variations in the invention in light of the above teachings that are obvious to one of ordinary skill in the art are considered within the scope of the invention as determined by the appended claims when interpreted to the breath to which they fairly, legitimately and equitably are entitled.

I claim:

1. A foldable poultry brood box comprising two congruent brood box blanks operatively and foldably connected one to the other;

each said brood box blank comprising a rectangular floor having a first large isosceles right triangular floor panel foldably connected respectively along each leg of said first large isosceles right triangular floor panel to a second small isosceles right triangular floor panel and to a third small isosceles right triangular floor panel, each said small isosceles right triangular floor panel congruent to the other, an integral endwall foldably connected and depending from and along the hypotenuse of said first large isosceles right triangular floor panel, two integral half sidewalls each said half sidewall foldably connected and depending from and along the length of a leg of an adjacent said small isosceles right triangular floor panel and each said half sidewall adjacent and foldably connected to respective opposite ends of said endwall, said rectangular floor having a floor free edge opposite said endwall;

said two brood box blanks foldably connected one to the other by foldably connecting said half sidewalls at opposite ends of said free floor edge of one said brood box blank to respective said half sidewalls at opposite ends of said free floor edge of the other said brood box blank;

a floor overlay insert received within said brood box substantially overlaying said floor free edges; and a poultry bedding placed in said brood box to cover said floor overlay insert.

2. A foldable poultry brood box in accordance with claim 1 further comprising at least one light fixture having a spring clamp mount attached by means of said clamp mount along one top edge of said brood box with said fixture aimed into said brood box from above whereby light and heat are directed into said brood box.

3. A foldable poultry brood box in accordance with claim 2 further comprising a plurality of vent flap die cuts selectively distributed across said endwalls forming a plurality of pivotable vent flaps that can be pivoted about a respective plurality of vent flap fold lines.

4. A foldable poultry brood box having a folding bottom comprising two congruent brood box blanks operatively and foldably connected one to the other;

each said brood box blank comprising a three-panel rectangular floor having a floor-length floor free edge and a floor-length isosceles right triangular floor panel foldably connected respectively along each leg of said floor-length isosceles right triangular floor panel to one of two flanking isosceles right triangular floor panel, each said flanking isosceles right triangular floor panel having a hypotenuse respectively congruent and along one of said legs of said floor-length isosceles right triangular floor panel and each said flanking isosceles right triangular floor panel having a respective free leg forming a half of said floor free edge;

an integral isosceles trapezoidal endwall having two endwall angled leg edges, an endwall smaller base free edge, and an endwall larger base edge, said endwall larger base edge congruent and foldably connected to said floor along the hypotenuse of said floor-length isosceles right triangular panel and said endwall extending outward from said floor;

and two integral right trapezoidal sidewalls, each said sidewall having a sidewall smaller base free edge, a sidewall angled leg edge adjacent congruent and foldably connected to one of said endwall angled leg edges, a sidewall perpendicular leg free edge away from said endwall, and a sidewall larger base edge, each said sidewall larger base edge congruent and foldably connected to said floor along a second leg of one of said respective flanking isosceles right triangular panels and each said sidewall respectively extending outward from said floor;

and said brood box blanks aligned to one another with respective floor-length floor free edges adjacent one another and with respective said sidewall perpendicular leg free edges of one said box blank operatively and foldably connected to respective adjacent congruent said sidewall perpendicular leg free edges of the other said box blank, and a floor overlay insert received within said brood box substantially overlaying said floor free edges.

5. A foldable poultry brood box in accordance with claim 4 wherein
said rectangular floor having two corner flap retaining slots, each said respective retaining slot located in a respective one of two interior corners of said rectangular floor away from said floor free edge;
said endwall having two endwall corner flap die cuts located proximate said respective endwall angled leg edges, each said endwall corner flap die cut forming a respective swinging door-like sail-shaped pivotable endwall corner flap having a lower distal endwall corner flap anchor tab proximate said floor, and a respective proximal endwall corner flap fold line perpendicular to said endwall larger base edge, each respective said endwall corner flap pivotable about said respective endwall corner flap fold line inwardly towards said floor free edge and for said respective anchor tab selectively to engage and be anchored in said respective flap retaining slot;
and each said sidewall having a sidewall corner flap die cut located proximate said sidewall angled leg edge, each said sidewall corner flap die cut forming a swinging door-like sail-shaped pivotable sidewall corner flap proximate said floor having a proximal sidewall corner flap fold line perpendicular to said sidewall larger base edge, said sidewall corner flap pivotable about said sidewall corner flap fold line inwardly towards said floor free edge to be selectively anchored behind said endwall corner flap.

6. A foldable poultry brood box in accordance with claim 5 further comprising a poultry bedding placed in said brood box to cover said floor overlay insert.

7. A foldable poultry brood box in accordance with claim 6 further comprising at least one light fixture having a spring clamp mount said light fixture attached by means of said clamp mount along one top edge of said brood box with said fixture aimed into said brood box from above whereby light and heat are directed into said brood box.

8. A foldable poultry brood box in accordance with claim 7 further comprising a plurality of vent flap die cuts selectively distributed across said endwalls forming a plurality of pivotable vent flaps that can be pivoted about a respective plurality of vent flap fold lines.

9. A foldable poultry brood box in accordance with claim 4 wherein
said rectangular floor having two floor corner bracing strut die cuts, each said respective bracing strut die cut located in a respective one of two interior corners of said rectangular floor away from said floor free edge and proximate respectively each of said legs of said first large isosceles right triangular floor panel, and each said bracing strut die cut forming a respective pivotable floor corner bracing strut having a bracing strut free end and a respective proximal bracing strut fold line perpendicular and across said legs of said first large isosceles right triangular floor panel, each respective said bracing strut pivotable about said respective strut fold line upwardly;
said endwall having two endwall corner flap die cuts each located proximate said respective endwall angled leg edges, each said endwall corner flap die cut forming a respective swinging door-like sail-shaped pivotable endwall corner flap having a lower distal angled corner and a lower distal endwall corner flap anchor hole proximate said floor, and a respective proximal endwall corner flap fold line perpendicular to said endwall larger base edge, each respective said endwall corner flap pivotable about said respective endwall corner flap fold line inwardly towards said floor free edge and for said respective anchor hole selectively to engage and be anchored by said respective bracing strut free end of respective said bracing strut; and
each said alternative sidewall having a sidewall corner flap die cut located proximate said sidewall angled leg edge, each sidewall corner flap die cut forming a swinging door-like sail-shaped pivotable sidewall corner flap having a lower distal angled corner and a lower distal sidewall corner flap anchor hole proximate said floor and a proximal sidewall corner flap fold line perpendicular to said sidewall larger base edge, said sidewall corner flap pivotable about said sidewall corner flap fold line inwardly towards said floor free edge for said respective anchor hole selectively to engage and be anchored by said respective bracing strut.

10. A foldable poultry brood box in accordance with claim 9 further comprising a poultry bedding placed in said brood box to cover said floor overlay insert.

11. A foldable poultry brood box in accordance with claim 10 further comprising at least one light fixture having a spring clamp mount attached by means of said clamp mount along one top edge of said brood box with said fixture aimed into said brood box from above whereby light and heat are directed into said brood box.

12. A foldable poultry brood box in accordance with claim 11 further comprising a plurality of vent flap die cuts selectively distributed across said endwalls forming a plurality of pivotable vent flaps that can be pivoted about a respective plurality of vent flap fold lines.

13. A foldable poultry brood box in accordance with claim 4 wherein
said rectangular floor having two floor corner bracing strut die cuts, each said respective bracing strut die cut located in a respective one of two interior corners of said rectangular floor away from said floor free edge and proximate respectively each of said legs of said first large isosceles right triangular floor panel, and each said bracing strut die cut forming a respective pivotable floor corner bracing strut having a bracing strut free end and a respective proximal bracing strut fold line perpendicular and across said legs of said first large isosceles right triangular floor panel, each respective said bracing strut pivotable about said respective strut fold line upwardly;
said endwall having two endwall corner flap die cuts each located proximate said respective endwall angled leg edges, each said endwall corner flap die cut forming a respective swinging door-like sail-shaped pivotable endwall corner flap having a lower distal rounded corner and a lower distal endwall corner flap anchor hole proximate said floor, and a respective proximal endwall corner flap fold line perpendicular to said endwall larger base edge, each respective said endwall corner flap pivotable about said respective endwall corner flap fold line inwardly towards said floor free edge and for said respective anchor hole selectively to engage and be anchored by said respective bracing strut free end of respective said bracing strut; and
each said alternative sidewall having a sidewall corner flap die cut located proximate said sidewall angled leg edge, each sidewall corner flap die cut forming a swinging door-like sail-shaped pivotable sidewall corner flap having a lower distal sidewall corner flap anchor hole proximate said floor and a proximal sidewall corner flap fold line perpendicular to said sidewall larger base edge, said sidewall corner flap pivotable about said sidewall corner flap fold line inwardly towards said floor free edge for said respective anchor hole selectively to engage and be anchored by said respective bracing strut.

14. A foldable poultry brood box in accordance with claim 13 further comprising a poultry bedding placed in said brood box to cover said floor overlay insert.

15. A foldable poultry brood box in accordance with claim 14 further comprising at least one light fixture having a spring clamp mount attached by means of said clamp mount along one top edge of said brood box with said fixture aimed into said brood box from above whereby light and heat are directed into said brood box.

16. A foldable poultry brood box in accordance with claim 15 further comprising a plurality of vent flap die cuts selectively distributed across said endwalls forming a plurality of pivotable vent flaps that can be pivoted about a respective plurality of vent flap fold lines.

* * * * *